Sept. 12, 1961     W. M. SHUTER     2,999,661
HANGER
Filed June 10, 1959
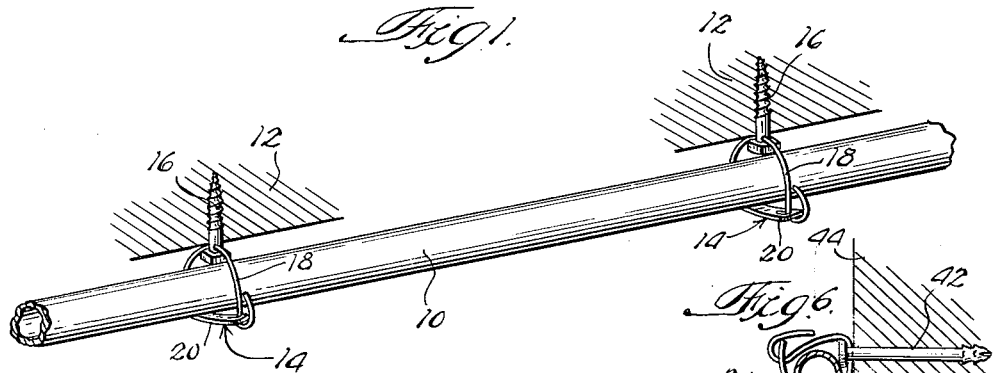
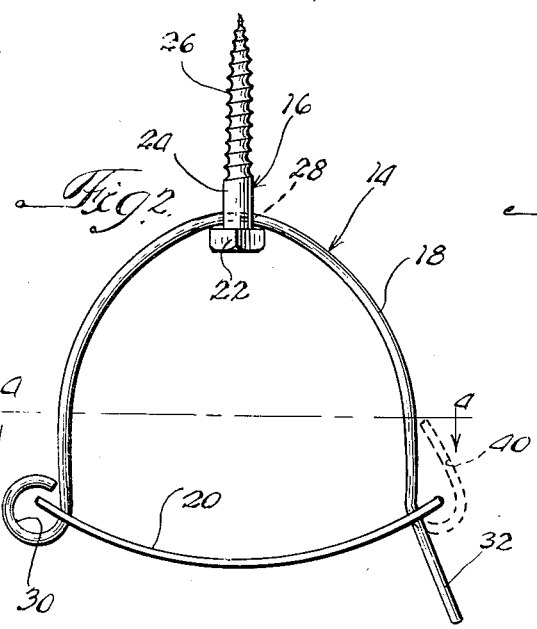
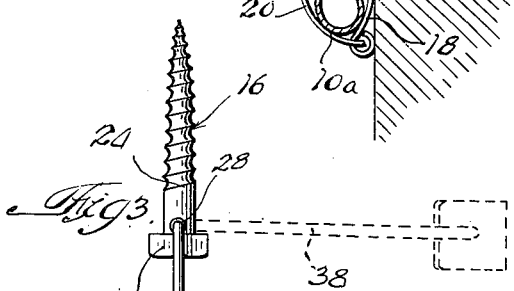
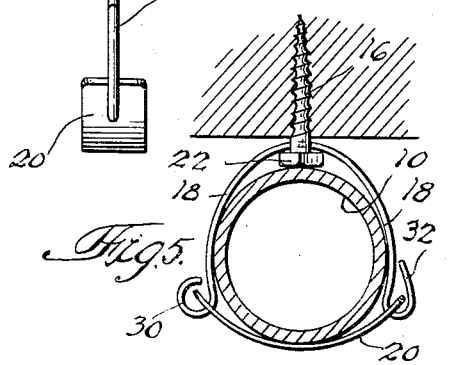
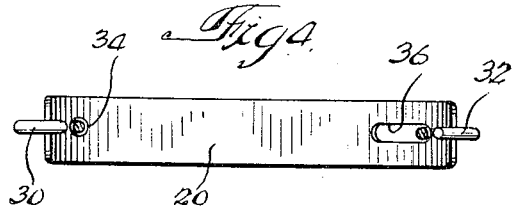
INVENTOR.
William M. Shuter.
BY
Olson, Mecklenburger, von Holst,
Pendleton & Neuman. Attys.

2,999,661
HANGER
William M. Shuter, 7806 Bryn Mawr Ave., Chicago 31, Ill.
Filed June 10, 1959, Ser. No. 819,497
4 Claims. (Cl. 248—62)

This invention relates to an improved hanger, and more particularly to a hanger for supporting elongate members such as pipes, wires, conduits, rods, tubes and the like.

Hanging pipes, conduits and wires is a common task which faces the public utilities industry as well as those who construct industrial plants and other buildings. Whether pipes and conduits are disposed within the walls or ceilings of a new building or are hung on existing walls or beneath existing ceilings, it is necessary to provide means for rigidly and permanently supporting such members in position. Similar problems arise in suspending conduits and the like from poles, arms and various frames in the utilities field.

Various clamps, brackets and hangers have heretofore been proposed for this purpose. Some are adapted to clamp the pipe or similar elongate member against the ceiling or wall with a U-shaped clevis which is secured to the supporting member with nails or screws on each side of the pipe. Others provide a single nail or screw to which a clamping device is secured or integrally formed and this assembly is driven into the wall or ceiling, after which the pipe is secured in place. In the latter devices, it is often difficult to secure the hanger to the wall in that the clamping portions interfere with the use of driving tools. A hammer or other tool cannot be directly applied to drive the hanger into the wall but some special auxiliary device or jig must be employed.

It is therefore one important object of this invention to provide an improved hanger for conduit and the like which may be easily fixed to supporting bodies.

It is another object of this invention to provide an improved hanger for supporting conduit and similar elongate members in which a headed securing means such as a nail or bolt may be employed in its conventional manner.

It is still a further object of this invention to provide an improved hanger for conduit, pipe, or the like in which a clamping portion adapted to engage the conduit is connected to a bolt or similar securing means in such a way that the bolt may be driven into place.

It is another object of this invention to provide an improved hanger for conduit and the like in which a clamping portion is hingedly mounted on a securing device such as a bolt whereby the clamping portion may be displaced from its normal position when the securing device is being applied to a wall, ceiling or the like.

It is still a further object of this invention to provide an improved hanger for elongate members which is extremely simple in construction and use, made of conventional parts and materials, and positive and reliable in holding conduit in place.

Further and additional objects of the invention will appear from this description, the accompanying drawing and the appended claims.

In one form of the invention a hanger is provided having a bolt with a conventional head and a transverse aperture adjacent to the head. An arcuate length of wire or flexible rod is passed through the aperture and formed at one end to define a loop which retains a freely movable strap. The other end of the strap is apertured to receive a free end of the wire in such a way that the wire may be distorted or deformed to form a locked, closed loop engaging a conduit or the like. The wire must be freely rotatable in the aperture of the bolt in order to facilitate the use of conventional tools in securing the bolt to a ceiling or the like.

For a more complete understanding of this invention reference will now be made to the accompanying drawing wherein:

FIG. 1 illustrates two hangers employing the teaching of this invention in use with a single length of pipe;

FIG. 2 is a front view of one of the hangers shown in FIG. 1 before it is applied to a length of pipe;

FIG. 3 is a side view of the embodiment of FIG. 2;

FIG. 4 is a top sectional view of the embodiment of FIG. 2 taken on the line 4—4 thereof;

FIG. 5 is a reduced view of the hanger of FIG. 2 clearly illustrating the use thereof in supporting a pipe beneath a ceiling; and FIG. 6 illustrates an alternate embodiment of the invention in use against a wall.

Referring now to the drawings and more particularly to FIG. 1 a length of pipe 10 is secured to a ceiling 12 by a pair of identical hangers 14. As will be obvious, the hangers 14 will be employed at spaced intervals along the length of the pipe and the number of hangers will depend upon the total length of the pipe and the desired spacing. As better illustrated in FIG. 2, the hanger 14 comprises a bolt 16, a clamp comprising a length of wire 18, and a strap 20 cooperating with and effectively forming an extension of wire 18.

Bolt 16 in the particular embodiment described has a conventional head 22 and an elongate shank 24 having threads 26 over a major portion of its length. The shank 24 is provided with a transverse aperture 28 adjacent head 22. Aperture 28 must be large enough to freely pass wire 18 while still permitting enough of shank 24 to remain to provide strength in the bolt 16. It has been found that most conventional bolts may be apertured in the manner shown without seriously impairing strength and serviceability.

The wire 18 is formed into a U-shaped member having one leg formed upon itself to provide a closed loop 30. The other leg or free end 32 of wire 18 is slightly offset for a purpose which will become obvious.

Strap 20 is provided with an aperture 34 to receive loop 30 providing a freely movable joint. The strap is somewhat arcuate and has a slotted free end 36 which receives offset leg 32. Thus, a simple three-part device can be assembled as shown in FIG. 2 and readily opened by sliding strap 20 away from offset leg 32 whereby a conduit may be received within the area defined by wire 18.

The manner in which the hanger described above is used will be clear from FIG. 3. The bolt 16 is placed in position against a wall or ceiling and the wire 18 rotated to the broken line position 38 in FIG. 3. The bolt may actually be held by an operator by gripping wire 18. Hammer blows are then applied to head 22 either for the purpose of starting bolt 16 into a supporting wall or ceiling or driving the bolt completely into place. When the bolt is positioned and the conduit in place adjacent the bolt, wire 18 is pivoted downwardly from position 38 to encompass the conduit. Thereafter strap 20 is placed over offset end 32 and end 32 is deformed with a pliers or similar tool to assume the broken line position 40 in FIG. 2. By continuously turning the pliers, the wire 18 is drawn through a slot 36 to rigidly engage the conduit and firmly support it in a single fixed position. This is clearly illustrated in FIG. 5 where conduit 10 is locked in place against head 22 by wire 18 and cooperating strap 20.

In FIG. 6 an alternate construction is illustrated in which a nail 42 is driven into a vertical wall 44. The optional use of screws, bolts, nails or the like as a securing means is believed manifest. Also, as illustrated in FIG. 6, the conduit 10a may not be precisely aligned with the head of the securing means, but this will in no way impair the efficiency or usefulness of the hanger. The hanger will be used in precisely the same manner with the strap 20 engaged at both ends by wire 18 and the wire distorted to rigidly support conduit 10a in any desired position.

While two specific embodiments have been fully described for use on either walls or ceilings, it will be immediately obvious that many variations can be incorporated in the basic teaching contained herein without departing from the spirit and scope of this invention. For example, the strap 20 may be replaced by a second piece of wire, by a rigid plate, or the plate may be omitted altogether and wire 18 extended around the conduit completely. Also, one or more securing means of many types such as nails, bolts or screws may be employed provided only that the clamping means and securing means are so related that the clamping means may be swung to a position where driving implements may be applied to the head of the securing means.

Without further elaboration, the foregoing will so fully explain the character of my invention that others may, by applying current knowledge, readily adapt the same for use under vary conditions of service, while retaining certain features which may properly be said to constitute the essential items of novelty involved, which items are intended to be defined and secured to me by the following claims.

I claim:

1. A hanger for elongate members comprising elongate securing means having a driving head formed at one end thereof, a transverse aperture adjacent said head, and a shaft portion adapted to penetrate and supportably engage a body to which said hanger may be fixed; and an elongate flexible clamp means passing through said aperture and rotatable about the axis thereof, said clamp means having free ends formed for locking engagement whereby the free ends of said clamp means may be locked to form a closed loop engaging and supporting said elongate member.

2. A hanger for elongate members comprising elongate securing means having a driving head formed at one end thereof, a transverse aperture adjacent said head, and a shaft portion adapted to penetrate and supportably engage a body to which said hanger may be fixed; and an elongate flexible clamp means passing through said aperture and rotatable about the axis thereof, said clamp means comprising a flexible shaped portion adapted to pass through said aperture and rotatable therein and having spaced legs which partially surround such elongate member and a strap portion hingedly connected to one of said legs and adapted for selective locking engagement with the other of said legs while said clamp means is engaged in said aperture.

3. A hanger for elongate members comprising elongate securing means having a driving head formed at one end thereof, a transverse aperture adjacent said head, and a shaft portion adapted to penetrate and supportably engage a body to which said hanger may be fixed; and an elongate flexible clamp means passing through said aperture and rotatable about the axis thereof, said clamp means comprising an elongate wire portion passing through said aperture and having a generally semicircular shape, a loop formed in one end of said wire portion, and a strap portion hanging from said loop and adapted to receive the other end of said wire portion in locking engagement.

4. A hanger for elongate members comprising elongate securing means having a driving head formed at one end thereof, a transverse aperture adjacent said head, and a shaft portion adapted to penetrate and supportably engage a body to which said hanger may be fixed; and an elongate flexible clamp means passing through said aperture and rotatable about the axis thereof, said clamp means comprising an elongate wire portion passing through said aperture and having a generally semicircular shape, a loop formed in one end of said wire portion, and a strap portion hanging from said loop and having a strap aperture formed in the free end thereof, the other end of said wire portion being received in said strap aperture and deformed to define a closed loop tightly engaging said elongate member.

References Cited in the file of this patent

UNITED STATES PATENTS

| | | |
|---|---|---|
| 311,282 | Blake | Jan. 27, 1885 |
| 1,450,640 | Norman | Apr. 3, 1923 |
| 2,417,269 | Robertson | Mar. 11, 1947 |